United States Patent
Chao et al.

(10) Patent No.: US 6,351,378 B1
(45) Date of Patent: Feb. 26, 2002

(54) FIXING DEVICE OF A DISK DRIVER

(75) Inventors: Jackie Chao, Taipei; James Chen, Yung Ho; John Hsu, Taipei, all of (TW)

(73) Assignee: Lite-On Enclosure Inc., Taipei (TW)

( * ) Notice: Subject to any disclaimer, the term of this patent is extended or adjusted under 35 U.S.C. 154(b) by 0 days.

(21) Appl. No.: 09/531,515

(22) Filed: Mar. 21, 2000

(51) Int. Cl.⁷ ............................. G06F 1/16; H05K 7/10
(52) U.S. Cl. .................... 361/685; 369/75.1; 369/77.1; 312/332.1; 360/97.01; 360/137
(58) Field of Search ................................. 361/685, 684, 361/683, 686, 724–727, 732; 369/75.1–82; 312/332.1, 333; 360/96.1, 97.01, 98.01, 137, 137 D; 248/618, 633, 634, 636, 638

(56) References Cited

U.S. PATENT DOCUMENTS

| | | | | |
|---|---|---|---|---|
| 5,325,263 A | * | 6/1994 | Singer et al. | 361/685 |
| 5,654,873 A | * | 8/1997 | Smithson et al. | 361/685 |
| 5,654,874 A | * | 8/1997 | Suzuki | 361/685 |
| 6,067,225 A | * | 5/2000 | Reznikov et al. | 361/685 |
| 6,166,901 A | * | 12/2000 | Gamble et al. | 361/685 |
| 6,299,266 B1 | * | 10/2001 | Justice et al. | 361/685 |

FOREIGN PATENT DOCUMENTS

JP  403224021 A  * 10/1991  ............. G06F/1/16

* cited by examiner

Primary Examiner—Leo P. Picard
Assistant Examiner—Lisa Lea-Edmonds
(74) Attorney, Agent, or Firm—Rosenberg, Klein & Lee

(57) ABSTRACT

A fixing device of a disk driver comprises a first body, a second body and two fixing elastic pieces. The first body has a bottom plate, one side of the bottom plate is connected to lateral plate, and fixing pins protrude from an inner wall of the lateral plate. The second body has a bottom plate, one side of the bottom plate is connected to a lateral plate, and fixing pins protrudes from an inner wall of the lateral plate. Two fixing elastic piece connected to the lateral plates of the first body and the second body, one end of each fixing elastic piece is formed with a buckling portion and a movable portion. The first body and the second body are assembled movably. A disk driver is disposed on the first body and the second body so that the fixing pins of the first body and the second body are inserted into respective holes preset at the two sides of the disk driver. Then the disk driver is inserted into a computer mainframe; and the buckling portions of the two fixing elastic pieces are buckled into the buckling grooves preset in the computer mainframe so that the disk driver is fixed to the computer mainframe.

4 Claims, 4 Drawing Sheets

FIXING DEVICE OF A DISK DRIVER

FIELD OF THE INVENTION

The present invention relates to a fixing device of a disk driver, and especially to a fixing device, wherein no screw is necessary. In assembly, labor and time are saved with a fast manufacturing speed and a lower cost.

BACKGROUND OF THE INVENTION

The function of a hard disk driver is to store a large amount of data. Most data of a computer is stored in a hard disk. The data required in running is mostly stored in a hard disk driver. Other than hard disk, another storing device is a disk the data of which is read through a floppy disk by a computer.

However, as the hard disk, floppy disk or other disk driver is fixed to a computer mainframe, which is fixed by a large amount of screws. In assembly, large labor and time are required so that the manufacturing speed is low and a large amount of screws are necessary. Therefore, manufacturing cost is increased greatly.

SUMMARY OF THE INVENTION

Accordingly, the primary object of the present invention is to provide a fixing device of a disk driver comprising a first body, a second body, and two fixing elastic pieces. The disk driver is disposed on the first body and the second body. The first body and second body may move relatively to one another for adjusting the gap between the lateral plate of the first body and the lateral plate of the second body so that the fixing pins of the first body and the second body are inserted into the respective holes preset at two sides of the disk driver, and then the disk driver is inserted into the computer mainframe so that the buckling portions of the two fixing elastic pieces are buckled into the buckling grooves preset in a computer mainframe, and thus the disk driver can be fixed to the computer mainframe. In the present invention, no screw is necessary. In assembly, labor and time are saved with a fast manufacturing speed and a lower cost.

The various objects and advantages of the present invention will be more readily understood from the following detailed description when read in conjunction with the appended drawing.

DETAILED DESCRIPTION OF THE PREFERRED EMBODIMENTS

Figure 1:
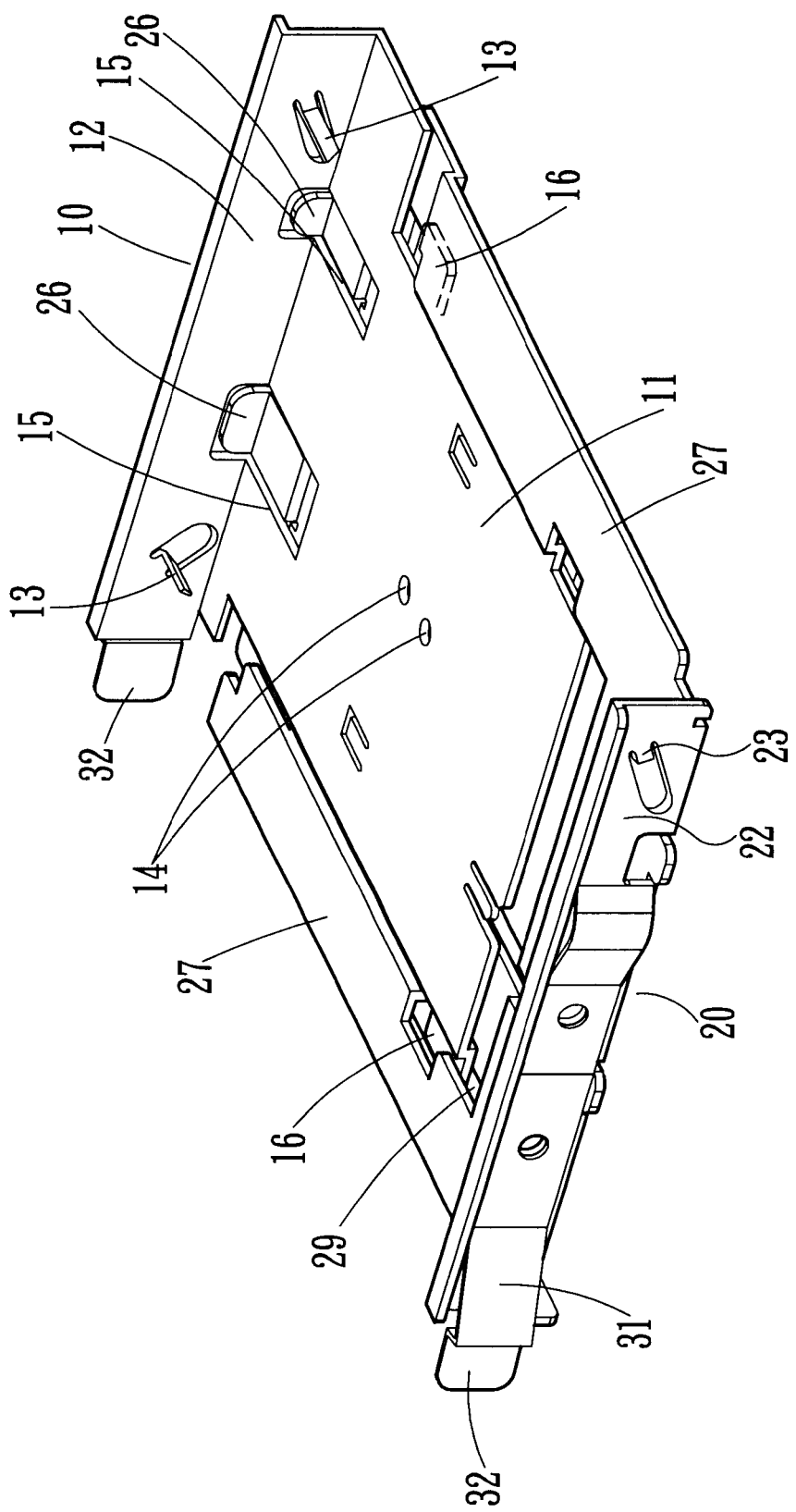
FIG. 1 is an assembly perspective view of the present invention.
Figure 2:
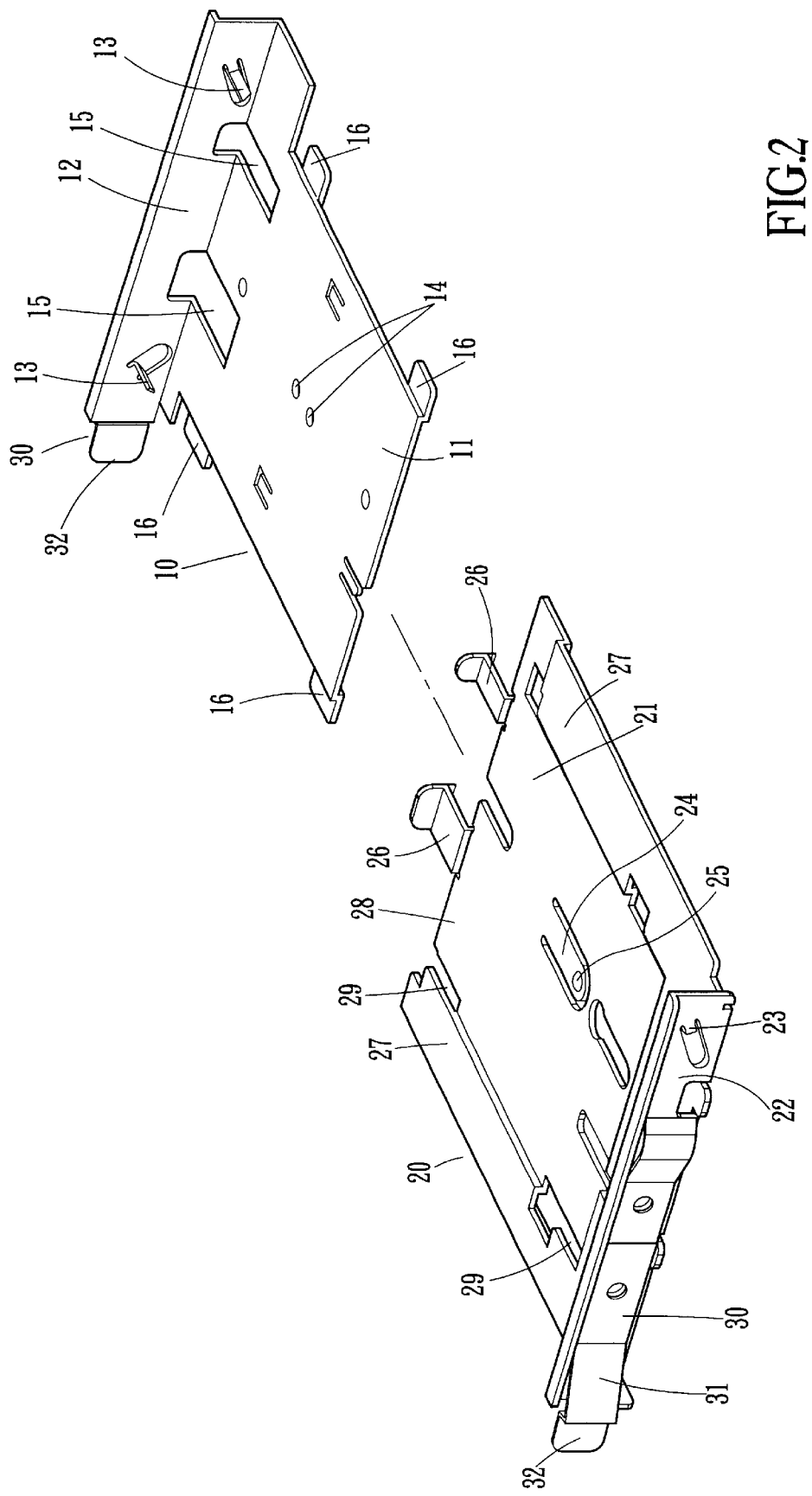
FIG. 2 is an exploded perspective view of the present invention.
Figure 3:
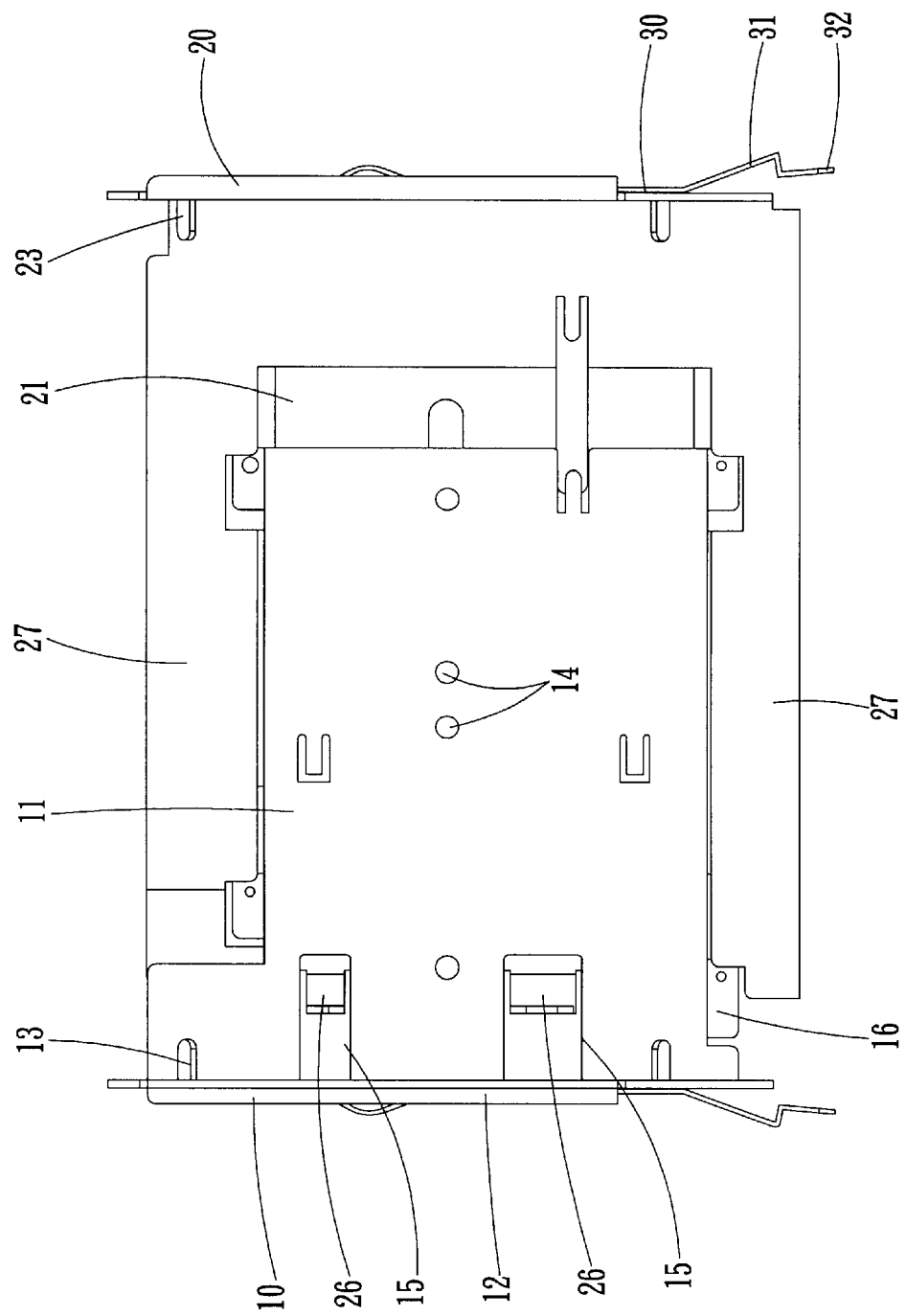
FIG. 3 is a schematic elevation view of the present invention.

With reference to FIGS. 1 to 3, the fixing device of a disk driver of the present invention is illustrated. The fixing device of a disk driver includes a first body 10, a second body 20 and two fixing elastic pieces 30. The first body 10 is made by punching a metal plate and has a horizontal bottom plate 11. One side of the bottom plate 11 is connected to a vertical lateral plate 12. Two fixing pins 13 protrudes from the inner wall of each lateral plate 12. A plurality of positioning holes 14 are installed on the bottom plate 11. Moreover, two guide grooves 15 are arranged at the side of the bottom plate 11 adjacent to the lateral plate 12. Each of the front and rear ends of the bottom plate 11 is protruded with two protrusions 16 with a lower height.

The second body 20 is made by punching a metal plate and has a horizontal bottom plate 21 one side of which is connected to a vertical lateral plate 22. The lateral plate 22 is protruded with two fixing pins 23 on the inner wall thereof. A positioning elastic piece 24 is installed on the bottom plate 21. The positioning elastic piece 24 is protruded with a positioning body 25. Furthermore, two guide portions 26 are arranged at the bottom plate 21 at one side with respective to the lateral plate 22. The front and rear ends of the bottom plate 21 are formed with respective higher protrusions 27. A lower concave portion 28 is formed between the two protrusions 27. Besides, each of the protrusions 27 is formed with two sliding grooves 29.

The two fixing elastic piece 30 are made of metal with preferred elasticity and are connected to the outer walls of the lateral plate 12 and 22 of the first body 10 and second body 20. One end of the fixing elastic piece 30 is formed with a buckling portion 31 and a movable portion 32. The buckling portion 31 is driven by the movable portion 32.

Figure 4:
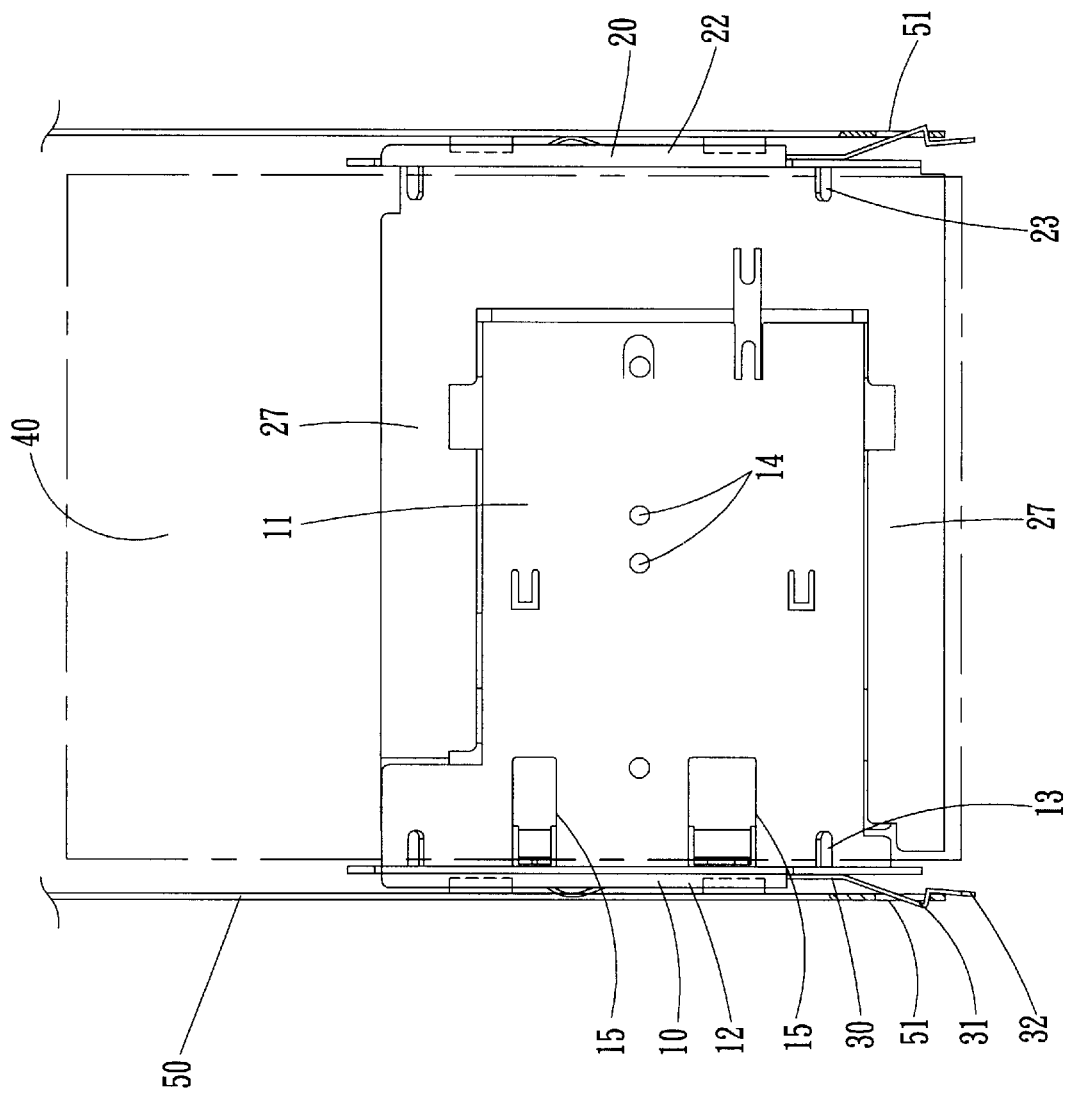
FIG. 4 is a schematic view showing that the present invention is disposed on a computer mainframe.

The bottom plate 11 of the first body 10 matches to the concave portion 28 of the second body 20 so that the first body 10 and the second body 20 are movably assembled. The first body 10 can move relatively to the second body 20 for adjusting the distance between the lateral plate 12 of the first body 10 and the lateral plate 22 of the second body 20 in order to suit the width of the disk driver (as shown in FIG. 4) arranged in the first body 10 and the second body 20. Thus, the fixing pins 13 and 23 of the first body 10 and the second body 20 can be inserted into the respective holes (not shown) at two sides of the disk driver 40. Moreover, the two guide portions 26 of the second body 20 matches with the respective guide grooves 15 of the first body 10 so as to guide the first body 10 and the second body 20 to move relatively and steadily. Moreover, four protrusions 16 of the first body 10 is slidably matched to the respective four sliding grooves 29 of the second body 20 for assisting the first body 10 and the second body 20 to move relatively and steadily. After the adjusting of the first body 10 and the second body 20 is completed, the positioning body 25 of the second body 20 is buckled in the positioning hole 14 of the first body 10 so that the first body 10 and the second body 20 are positioning steadily.

When the disk driver 40 is fixed between the lateral plates 12 and 22 of the first body 10 and the second body 20, it can be inserted into the computer mainframe 50. As the first body 10 and the second body 20 are inserted into a predetermined point, the bottom plates 31 of the two fixing elastic pieces 30 can be buckled to preset buckling grooves 51 in the computer mainframe 50 so that the disk driver 40 can be fixed to the computer mainframe 50. In the present invention, no screw is used, and thus time and labor are saved in assembling so that the manufacturing speed is fast. Therefore, cost is down greatly. If it is desired to take out the disk driver 40, it is only necessary to move inwards the two movable portions 32 of the two fixing elastic pieces 32 so that the buckling portions 31 separates from the buckling grooves 51. Then, the first body 10, second body 20 and disk driver 40 are withdraw from the computer mainframe 50 for taking out the disk driver 40.

Accordingly, the present invention has improved the fixing device of a disk driver. In the prior art fixing device of a disk driver, a large amount of screws are necessary. Thus time and labor are not saved in assembling so that the manufacturing speed is low. Therefore, cost is high.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fixing device of a disk driver comprising:

a first body having a bottom plate, one side of the bottom plate being connected to a lateral plate, fixing pins protruding from an inner wall of the lateral plate;

a second body having a bottom plate, one side of the bottom plate being connected to a lateral plate, fixing pins protruding from an inner wall of the lateral plate; and two fixing elastic pieces connected to the lateral plates of the first body and the second body, an end of each fixing elastic piece being formed with a buckling portion and a movable portion;

wherein the first body and the second body are assembled movably; a disk driver being disposed on the first body and the second body so that the fixing pins of the first body and the second body being inserted into a plurality of respective holes preset at the two sides of the disk driver;

and then the disk driver being inserted into a computer mainframe;

and the buckling portions of the two fixing elastic pieces are buckled into a pair of buckling grooves preset in the computer mainframe so that the disk driver is fixed to the computer mainframe.

2. The fixing device of a disk driver as claimed in claim 1, wherein a plurality of positioning holes are installed on the bottom plate of the first body, a positioning elastic piece is installed on the bottom plate of the second body, a positioning body protrudes from the positioning elastic piece, the positioning body of the second body buckles into the positioning holes of the first body.

3. The fixing device of a disk driver as claimed in claim 1, wherein two guide grooves are installed at one side of the bottom plate of the first body adjacent to the lateral plate; two guide portions are installed at a side of the bottom plate of the second body with respect to the lateral plate, the guide portions of the second body are matched to the guide grooves of the first body.

4. The fixing device of a disk driver as claimed in claim 1, wherein protrusions protrude from a front and a rear end of the bottom plate of the second body, a concave portion is formed between said protrusions, each protrusion is installed with sliding grooves, the first body is matched to the concave portion of the second body, and the protrusions of the first body is movably matched to the sliding grooves of the second body.

* * * * *